(12) United States Patent
Prunier

(10) Patent No.: US 6,321,354 B1
(45) Date of Patent: *Nov. 20, 2001

(54) TESTABLE CIRCUIT WITH A LOW NUMBER OF LEADS

(75) Inventor: Jacques Prunier, Sassenage (FR)

(73) Assignee: SGS-Thomson Microelectronics S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,893

(22) Filed: Apr. 28, 1998

(30) Foreign Application Priority Data

Apr. 29, 1997 (FR) .................................. 97 05592

(51) Int. Cl.[7] ...................................... G01R 31/28
(52) U.S. Cl. ..................... 714/726; 714/724; 714/727
(58) Field of Search ............................. 340/826; 714/731, 714/30, 233, 26, 724, 726, 727; 365/233; 709/100

(56) References Cited

U.S. PATENT DOCUMENTS

| 4,623,888 | * | 11/1986 | Waring | 340/826 |
|---|---|---|---|---|
| 4,995,039 | * | 2/1991 | Sakashita et al. | 714/731 |
| 5,157,781 | * | 10/1992 | Harwood et al. | 714/30 |
| 5,561,761 | | 10/1996 | Hicok et al. | 395/183 |
| 5,590,354 | | 12/1996 | Klapproth et al. | 395/800 |
| 5,617,531 | * | 4/1997 | Crouch et al. | 714/30 |
| 5,784,382 | * | 7/1998 | Byers et al. | 714/726 |
| 5,898,701 | * | 4/1999 | Johnson | 714/726 |
| 5,936,977 | * | 8/1999 | Churchill et al. | 714/26 |
| 5,953,285 | * | 9/1999 | Churchill et al. | 365/233 |
| 5,968,114 | * | 10/1999 | Wentka et al. | 709/100 |

OTHER PUBLICATIONS

French Search Report from French Patent Application 97 05592, filed Apr. 29, 1997.

* cited by examiner

Primary Examiner—David Ton

(57) ABSTRACT

The present invention relates to an electronic device of the "SMARTCARD" type including a single input/output lead for communicating with the microcontroller from the outside. Interface registers between a peripheral and the microcontroller are likely to be connected according to a shift register configuration forming a test scan path accessible in series and clocked by a clock signal to be applied to a peripheral clock lead. A test aid circuit, in a scan mode, connects the interface registers according to the shift register configuration, the scan mode being selected when a test bit, accessible through the input/output lead, is enabled and the input/output lead is forced from the outside to a state distinct from its default state.

6 Claims, 3 Drawing Sheets

TESTABLE CIRCUIT WITH A LOW NUMBER OF LEADS

BACKGROUND OF THE INVENTION

1. Field of the Invention

The present invention relates to electronic devices having a low number of leads with predefined functions, and especially portable electronic devices of the "SMART-CARD" type. The present invention more specifically relates to the testing of such electronic devices.

2. Discussion of the Related Art

FIG. 1 schematically shows the internal structure of an electronic device 10 of the "SMARTCARD" type. The device includes a microcontroller 12, or core, coupled to a peripheral 14 by a conventional bus including data lines D, address lines A, and control lines C. Further, microcontroller 12 receives interruptions INT from peripheral 14.

The device only includes eight leads having very precise functions. Two leads, Vdd and Vss, are used to supply the device. An input/output lead I/O forms the only input path to microcontroller 12. Peripheral 14 is connected to a data input lead Din and to a data output lead Dout. The microcontroller is clocked via a clock lead CLK while peripheral 14 is clocked independently via a clock lead DCLK. A general reset lead RST is used to reset all elements of device 10.

The devices of the type of FIG. 1 are often used to decrypt data. In this case, the encrypted data arrive on lead Din, undergo processing in peripheral 14 determined by microcontroller 12, and come out decrypted through lead Dout. The data are processed asynchronously with respect to the operation of the microcontroller, which explains the use of two clocks CLK and DCLK. The key used for the decryption, which thus determines the processings to be performed by peripheral 14, is stored inaccessibly in microcontroller 12. Thus, for security reasons, the possibilities of action upon microcontroller 12 via lead I/O are limited.

Lead I/O especially enables setting microcontroller 12 in a test mode to perform an exhaustive test of the microcontroller. Lead I/O then is by default in the input mode.

The several actions authorized from the outside on microcontroller 12 are obtained by exchanging information through lead I/O according to a predefined protocol.

A disadvantage of such a device is that its possibilities, especially for testing, are particularly limited due to the low number of leads all having assigned functions and due to the fact that the possibilities of access to the device via lead I/O are limited for security reasons.

Further, microcontroller 12 being programmed to interpret the protocol, perform the required actions, and return the results via lead I/O, the actions must remain simple in order not to increase the memory capacity of the microcontroller and thus the size of the device. The programming no longer allows the protocol to vary.

Finally, this device is poorly adapted to the testing of complex peripherals, since the tests performed, as they are extremely varied, are difficult to codify with a protocol. The information to be sent back to the microcontroller through data lines D or interrupt lines INT can only be established after the execution of complex sequences which are difficult to integrate to the protocol.

SUMMARY OF THE INVENTION

An object of the present invention is to render a large number of elements of a device of the above-mentioned type testable from the outside.

This and other objects are achieved by means of an electronic device including a microcontroller which can be set in a specific mode in which internal registers can be modified from outside; a peripheral internally coupled to the microcontroller via interface registers; a single input/output lead for communicating with the microcontroller from the outside; a peripheral input lead and a peripheral output lead; a microcontroller clock lead and a peripheral clock lead. The interface registers can be connected according to a shift register configuration forming a test scan path accessible in series and clocked by a clock signal to be applied to the peripheral clock lead. A test aid circuit, in a scan mode, connects the interface registers according to the shift register configuration, the scan mode being selected when a test bit, accessible through the input/output lead, is enabled, and when the input/output lead is forced from the outside to a state distinct from its default state.

According to an embodiment of the present invention, the device further includes a general reset lead directly connected to a reset input of the microcontroller. This general reset lead is connected to a reset input of the peripheral via a flip-flop connected in the scan path.

According to an embodiment of the present invention, the content of the flip-flop can be modified by the microcontroller.

According to an embodiment of the present invention, the peripheral includes a memory which the microcontroller accesses in the read mode through an internal bus. A flip-flop is connected in the scan path, an active state of which causes a reading from said memory, a capture register, also connected in the scan path, being provided for storing the word presented at the memory output.

According to an embodiment of the present invention, the device includes means for preventing the activation of the reset of the peripheral by a state of the flip-flop when the scan mode is selected.

The present invention also provides a method of testing a device of the above-mentioned type, including the steps of enabling the test bit via the input/output lead; stopping the clock of the microcontroller; forcing the input/output lead to the state opposite to its default state; and inputting or extracting data in series at the rate of the peripheral clock in the scan path through the input lead or through the output lead of the peripheral.

The foregoing objects, features and advantages of the present invention will be discussed in detail in the following non-limiting description of specific embodiments in connection with the accompanying drawings.

DETAILED DESCRIPTION

Figure 1:
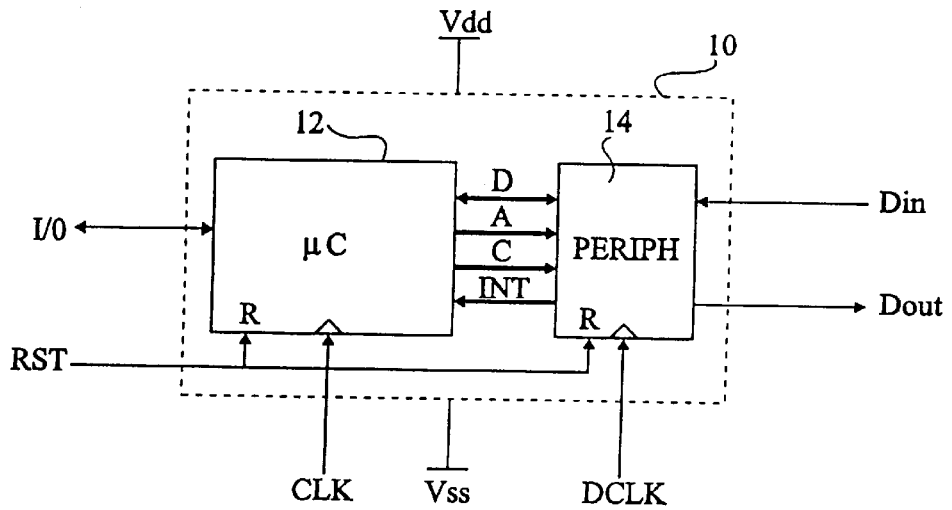
FIG. 1, previously described, schematically shows a conventional "SMARTCARD"-type device.
Figure 2:
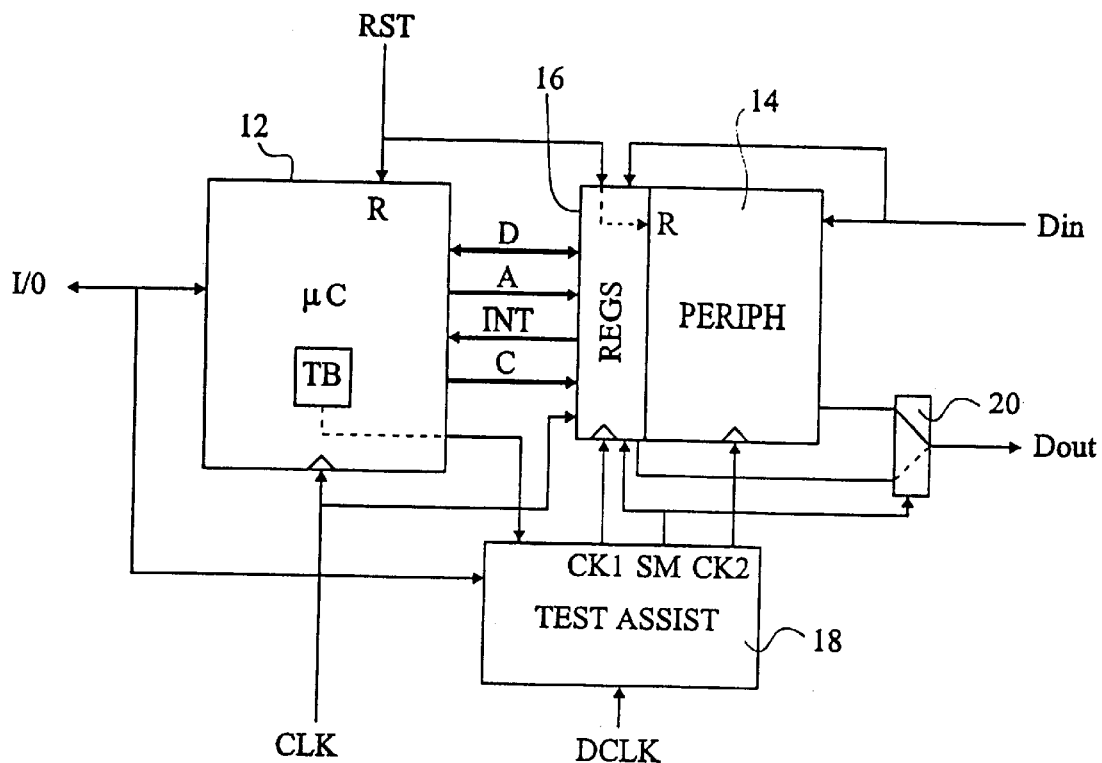
FIG. 2 schematically shows a device of the type of FIG. 1 modified according to the present invention to enable an efficient testing.

In FIG. 2, in a "SMARTCARD" type device according to the present invention, several registers 16 currently located at the interface between peripheral 14 and microcontroller 12 can be connected according to a shift register configuration to form a scan path. These interface registers are registers accessible in the write mode by microcontroller 12 by data lines D, address lines A, and control lines C. Further, peripheral 14 generally includes a state register from which interruptions are transmitted to microcontroller 12. This state register is thus also inserted in the scan path.

The forming of a scan path from the registers which are located at the inputs and outputs of a circuit is a conventional technique to render the circuit testable. To use this technique, at least four additional leads are normally needed on the circuit, a first one being used to input test data in series into the scan path, a second one being used to extract the data from the scan path, a third one being used to provide a test clock for clocking the data flow in the scan path, and the fourth one being used to set the circuit in a scan mode in which the register connection is modified so that they constitute a shift register to form the scan path.

However, a device of "SMARTCARD" type does not have any additional leads that allows exploitation of a conventional scan path. An aspect of the present invention is to enable the exploitation of a scan path in a "SMARTCARD" type device, using the existing leads.

According to the present invention, an internal signal SM that sets the scan mode is generated from existing leads. For this purpose, a test bit TB is provided which is conventionally accessible, at least in the write mode, via input/output lead I/O and the information exchange protocol. Of course, to be able to modify test bit TB, the device must first be set in a mode which enables it, that is, in the test mode. It should be noted that, conventionally, in the idle state, lead I/O is in the input mode and is thus controllable from the outside. An internal test aid circuit 18 activates scan mode signal SM when test bit TB is enabled (for example in state 1) and input/output lead I/O is in a state (for example 1) different from its idle state.

Thus, to activate internal scan mode signal SM, the user, from the outside, starts with enabling test bit TB conventionally via input/output lead I/O, stops clock CLK of the microcontroller, which makes lead I/O available, and then forces lead I/O to 1.

As long as test bit TB is enabled, microcontroller 12 keeps its normal operation, which will further disable test bit TB via lead I/O again. Accordingly, a succession of modifications of the state of lead I/O, be it only to disable test bit TB, risks misinterpretation by microcontroller 12 as orders. To avoid this, clock CLK of the microcontroller is frozen when lead I/O is forced to 1 to activate scan mode signal SM. Upon the resumption of its activity by the microcontroller during the tests, peripheral clock DCLK is frozen in order to avoid any misinterpretation of the state of lead I/O.

The input of the scan path formed by registers 16 when signal SM is active is connected to peripheral input lead Din.

The output of this exploration path is coupled with peripheral output Dout via a multiplexer 20 which selects the normal output of peripheral 14 when signal SM is inactive, and which selects the output of the scan path when signal SM is active.

Registers 16 are conventionally enabled individually by a decoding of addresses A and of a write signal synchronized with clock CLK of the microcontroller. In the scan mode, clock CLK is frozen and the registers must all be clocked by a common test clock. This test clock is provided via clock lead DCLK of the peripheral. As is shown, registers 16 receive a clock signal CK1 generated by aid circuit 18. Signal CK1 is frozen outside the scan mode and is equal to signal DCLK in the exploration mode.

Preferably, peripheral 14 is frozen during a scan phase. For this purpose, aid circuit 18 issues thereto a clock signal CK2 which is equal to signal DCLK outside the scan mode and which is frozen in the scan mode.

Of course, when test bit TB is disabled, the state of lead I/O will vary, which will cause spurious activations of scan mode signal SM. To avoid a spurious shifting of the content of registers 16 which could result therefrom, peripheral clock DCLK is frozen, as has been mentioned hereabove.

With the logic states mentioned hereabove as an example, aid circuit 18 performs the following logic functions:

SM=I/O.TB

CK1=(DCI,K.SM)

CK2=(DCLK.SM*)

where symbol * designates the logic complement of the signal before it.

According to an embodiment illustrated in FIG. 2, reset input R of peripheral 14 is not directly connected to general reset lead RST. Conversely, it is connected thereto, as is shown in dotted lines, via an additional flip-flop inserted in the scan path. This will be described in more detail hereafter.

Figure 3:
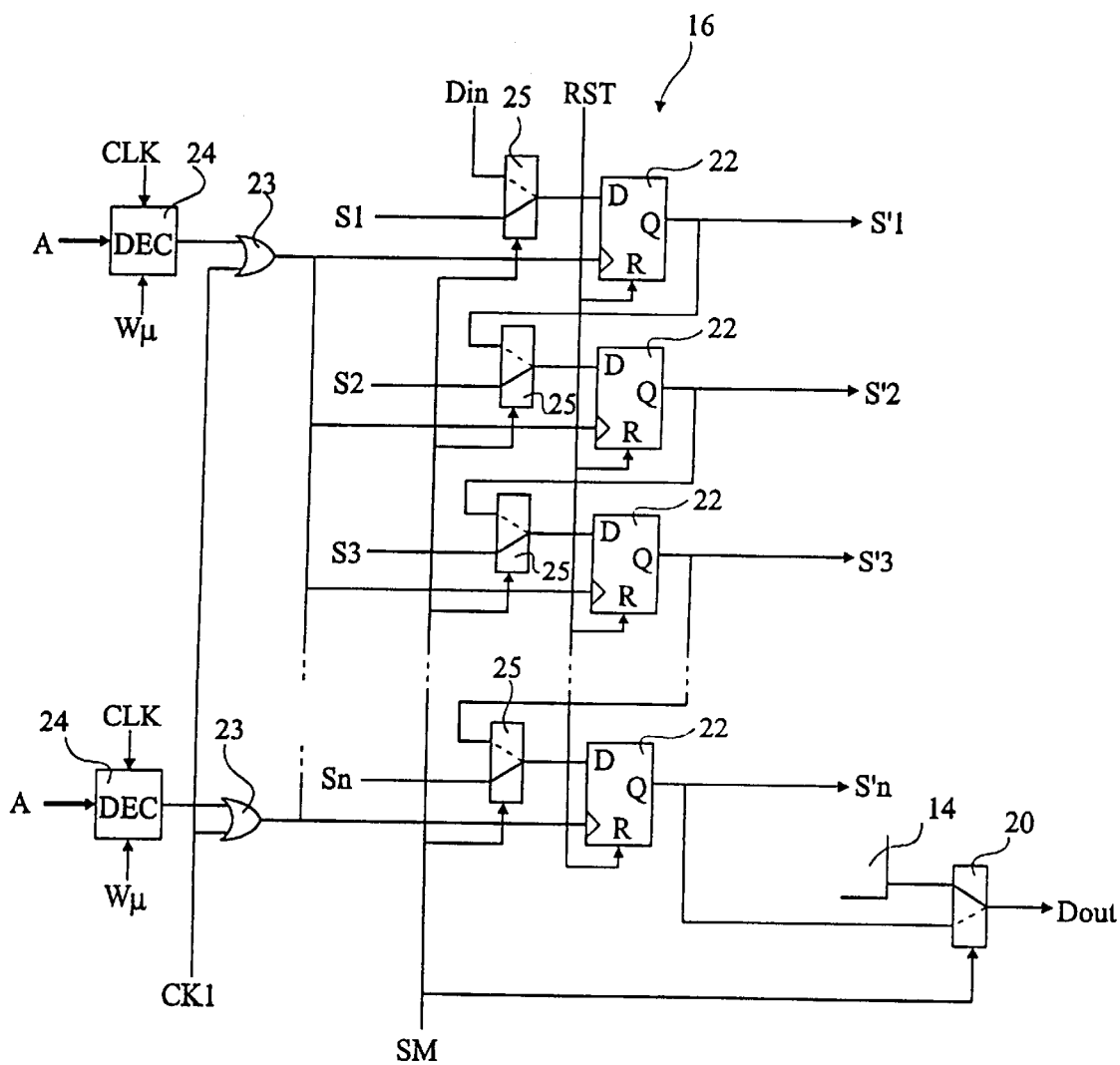
FIG. 3 shows flip-flops of interface registers between the microcontroller and the peripheral which can, according to the present invention, be connected according to a shift register configuration to form a scan path.

FIG. 3 shows as an example a structure enabling connection of the flip-flops of interface registers 16 according to a normal configuration and according to a shift register configuration to form a scan path.

The interface registers include flip-flops 22 to normally store the states of respective signals S and retransmit these states onto respective signals S'. Each register includes one or several flip-flops 22, the clock inputs of which are connected to a specific selection line. As an example, the first flip-flops have been shown as belonging to a same register. Each specific selection line is connected to the output of an OR gate 23 which receives scan clock CK1. Further, each OR gate 23 receives the selection signal conventionally received by the clock inputs of the flip-flop, that is, the output of an address decoder 24. Each address decoder 24 conventionally activates its output when the address on address bus A corresponds thereto and when clock signal CLK and a write signal Wµ of the control bus are active.

Flip-flops 22 all receive general reset signal RST.

In front of the input D of each flip-flop 22 is connected a multiplexer 25 which selects the corresponding signal S in normal mode (SM=0) or the output signal S' of the preceding flip-flop in scan mode (SM=1). In scan mode, the first multiplexer 25 selects the input Din of the peripheral while multiplexer 20 selects output S' of the last flip-flop 22 to issue it to output lead Dout. Thus, in scan mode, all flip-flops 22 are connected in a shift register between input Din and output Dout.

Scan path 16 of FIG. 2 will enable, conventionally, checking what microcontroller 12 writes into registers 16 by operating the microcontroller in normal mode and then reading, in scan mode, the content of registers 16 via lead Dout. It also enables, in scan mode, preloading registers 16 with desired values via lead Din and then, in normal mode, to check the behavior of peripheral 14 via leads Din and Dout and by recovering the content of the state registers (INT) by lead Dout in scan mode.

However, the effects of a general reset cannot be sufficiently checked. If the reset of peripheral 14 was desired to be tested via microcontroller 12, the latter would be programmed to write ones in all memory nodes accessible thereto in peripheral 14 to then read them after a reset. However, the general reset also causes the reset of the microcontroller, whereby the microcontroller can never reach the final portion of the program, meant to reread the reset memory nodes. It would further be difficult to consider performing a reset, which is to occur from the outside, at the right time during the execution of the test program.

Figure 4:
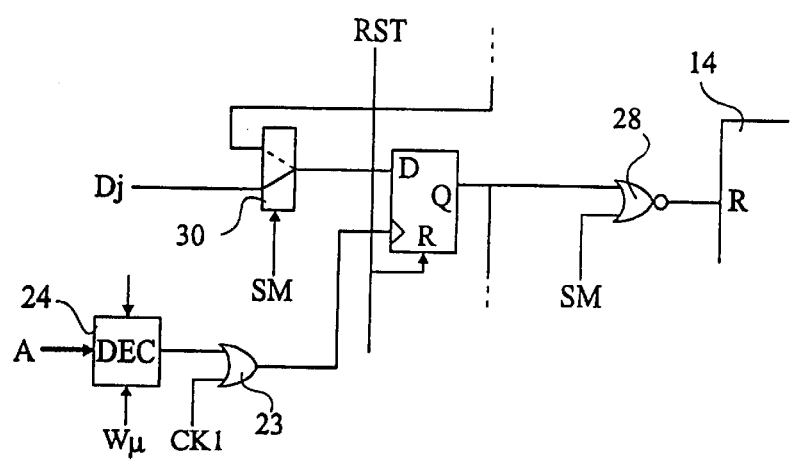
FIG. 4 shows an additional flip-flop to be inserted in the scan path in order to enable testing of the general reset functionality.

FIG. 4 shows an advantageous option enabling resetting the peripheral from the outside or through the microcontroller, without resetting either the microcontroller or registers 16. It will be assumed hereafter that the reset of the peripheral is obtained by presenting state 1 on its input R.

A flip-flop 26 is added to the scan path formed by flip-flops 22. The D input of this flip-flop 26 is connected to the output S' of a preceding flip-flop while the Q output of this flip-flop is coupled to the input of the next flip-flop (by a multiplexer 25, if present).

The Q output of flip-flop 26 is further connected to the reset input R of peripheral 14, which input, as is shown in FIG. 2, is not connected to general reset lead RST. More precisely, the reset signal of peripheral 14 is issued by a NOR gate 28 which receives on a first input the Q output of flip-flop 26 and on a second input scan mode signal SM. Thus, a zero state of flip-flop 26 only causes a reset of peripheral 14 when the scan mode signal SM is at zero (inactive). This avoids a spurious reset of peripheral 14 when data flow in the scan path, included in flip-flop 26, during a scan phase.

The D input of flip-flop 26 is, like the other flip-flops 22, connected to the output of a multiplexer 30. When scan mode signal SM is active, multiplexer 30 selects output S' of the preceding flip-flop. When signal SM is inactive, multiplexer 30 selects a line Dj of data bus D, through which the microcontroller can modify the state of flip-flop 26.

The clock input of flip-flop 26 receives, like flip-flops 22, the output of an OR gate 23, itself receiving clock CK1 and the output of an address decoder 24, which makes flip-flop 26 accessible in the write mode by a microcontroller. Further, flip-flop 26 also receives general reset signal RST.

Upon a general reset by an activation of signal RST, flip-flop 26 is reset, which causes the reset of peripheral 14 along with all the other elements of the device.

Upon power-on, after a general reset, the microcontroller writes a 1 into flip-flop 26 to release the peripheral from its reset state. Then, at any moment, the microcontroller can cause a reset of the peripheral, without resetting other elements, by writing a 0 into flip-flop 26.

A reset testing program is particularly simple and takes up little space in the memory, so that it is acceptable to integrate it in the microcontroller. This testing program includes writing 1s into the memory nodes, causing a reset, rereading the memory nodes as a check, and storing the results so that they can be recovered from outside through input/output lead I/O.

Of course, the state of flip-flop 26 may also be established from outside by means of data input in the scan path in the scan mode. In the scan mode (SM=1), gate 28 prevents spurious resets of peripheral 14 by bits which transit through flip-flop 26. Additional OR gates may be connected, like gate 28, to the outputs of flip-flops 22, if the bits which flow in series in the flip-flops during the scan mode risk to cause spurious reactions of the peripheral.

In the device such as described up to now, the registers 16 forming the scan path are essentially registers used in the write mode by the microcontroller (except for the state registers which are positioned by the peripheral). Now, the peripheral includes elements which are accessible in the read mode by the microcontroller, for example, FIFO-type memories, which present their data on the bus, without transiting through interface registers. The content of these memories thus cannot be checked via the scan path.

Figure 5:
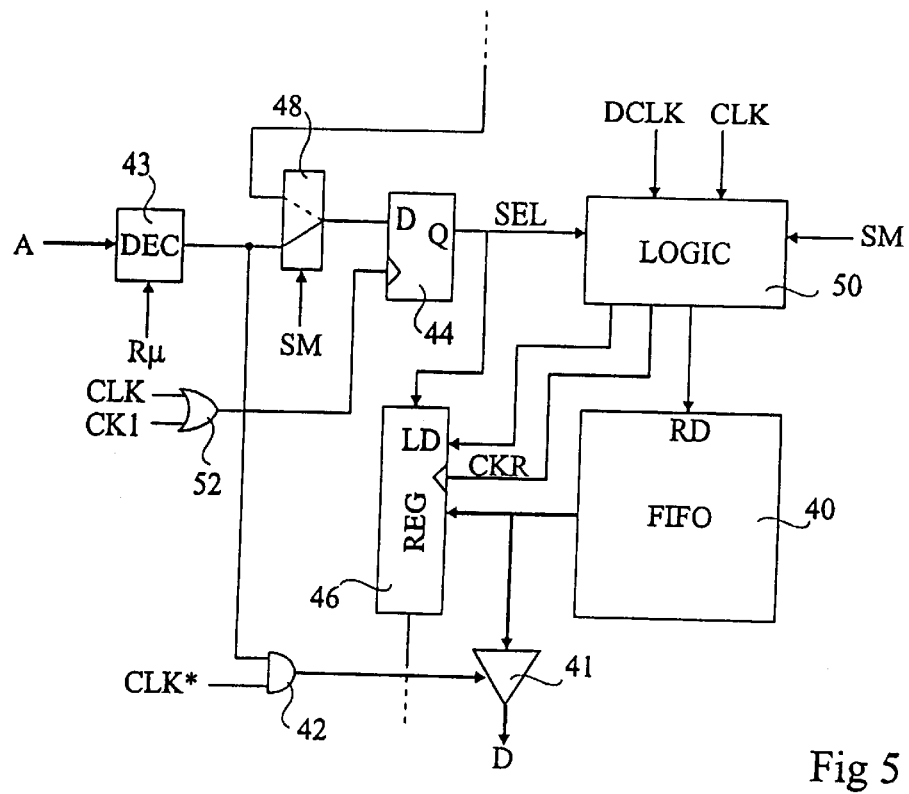
FIG. 5 shows a flip-flop and a register inserted in the scan path in order to capture, during a test phase, the content of a memory of the peripheral.

FIG. 5 illustrates a solution according to the present invention to recover the content of a FIFO memory 40 of the peripheral via the scan path.

The output of FIFO memory 40 is connected to data lines D via three-state gates 41 which are at high impedance in the absence of read cycle by the microcontroller. Gates 41 are controlled by an AND gate 42 which receives the complement CLK* of clock signal CLK and the output of an address decoder 43. The output of decoder 43 is activated when an address corresponding thereto is presented on address bus A and when a read signal R$\mu$ is activated by the microcontroller. Conventionally, read signal RD used to correspond to the output of address decoder 43, synchronized on clock CLK.

In the embodiment of FIG. 5, a selection flip-flop 44 and a capture register 46 disposed in the scan path are provided. Selection register 44 is meant to contain a bit which determines whether or not read accesses to memory 40 are performed, and register 46 is meant for receiving the output of memory 40.

The D input of flip-flop 44 is connected to the output of a multiplexer 48. When scan mode signal SM is inactive, multiplexer 48 selects the output of address decoder 43. In the opposite case, multiplexer 48 selects the output S' of the preceding flip-flop in the scan path. Output SEL of flip-flop 44 is connected to a series input of register 46 which is of shift and preload type. The series output of register 46 is connected to the multiplexer preceding the following flip-flop in the scan path.

Output SEL of flip-flop 44 is further issued to a logic circuit 50 which establishes read signal RD of memory 40, clock signal CKR of shift register 46, and a signal LD of preload of register 46, according to signal SEL, to scan mode signal SM, and to clock signals DCLK and CLK. While register 46 is clocked by a specific clock signal CKR in scan mode, flip-flop 44 is clocked by a logic OR 52 between clock CK1 and clock CLK.

Figure 6A:
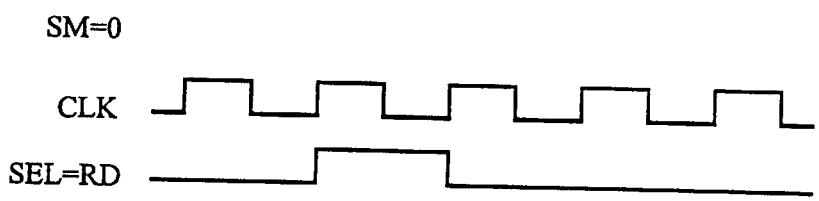
FIGS. 6A and 6B show timing diagrams illustrating the normal operation and the operation in scan phase of the circuit of FIG. 5.

FIG. 6A shows a timing diagram illustrating a normal reading from FIFO memory 40, that is, when the scan mode signal is inactive (SM=0), when the test bit is not enabled, and clock CLK of microcontroller 12 is not frozen.

At the time when the microcontroller desires to have a read access to FIFO memory 40, it presents on the bus the address recognized by decoder 43. As soon as the next rising edge of clock CLK occurs, the active state present at the output of decoder 43 passes into flip-flop 44, whereby signal SEL is activated. Logic circuit 50 issues signal SEL as read signal RD. Flip-flop 44 synchronizes the read cycles on signal CLK.

In normal mode, that the data read be written into register 46, or that signal CKR varies, is of little importance.

Figure 6B:
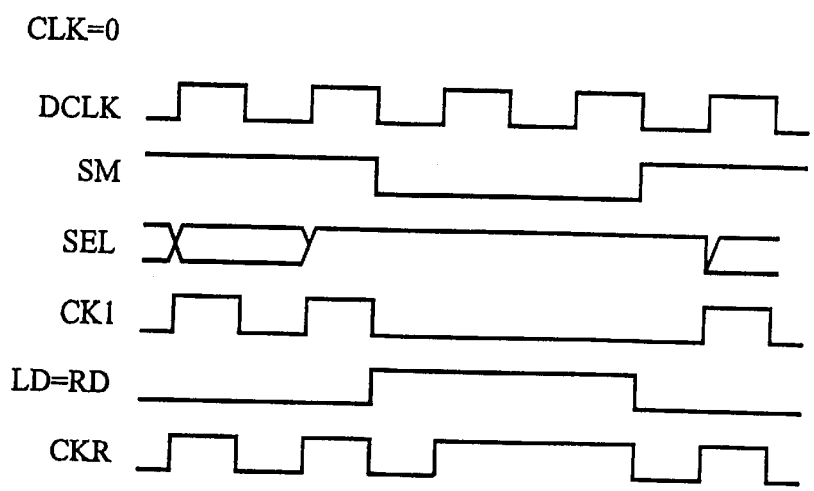

FIG. 6B shows a timing diagram illustrating a procedure meant to recover the output of FIFO memory 40 via the scan path when test bit TB is enabled.

Clock CLK of the microcontroller is frozen while clock DCLK of the peripheral operates continuously.

Initially, scan mode signal SM is active, which causes a data flow in the scan path from input in to output Dout at the rate of clock CK1, then equal to clock DCLK. Peripheral 14 is inactive since its clock CK2 is frozen when signal SM is active.

Signal SEL varies randomly, according to the bits which flow in the scan path. These random states of signal SEL are ignored as long as scan mode signal SM is active. Capture register 46 being in the scan path, its clock CKR is activated at the rate of clock CK1 to shift the data.

As soon as all the desired bits have been input in the scan path, signal SM becomes inactive at the following falling edge of clock DCLK. If the output of FIFO memory 40 is desired to be recovered, flip-flop 44 is at 1, that is, signal SEL is active.

The deactivation of signal SM stops clocks CK1 and CKR.

Read signal RD and preload signal LD are equal to the complement of signal SM if signal SEL is active. In the opposite case, signals RD and LD remain inactive.

Upon activation of signal RD, memory 40 is incremented and presents a new datum at its output and thus on the flip-flops of register 46 set to the preload mode by signal LD. At the following rising edge of clock DCLK, signal CKR is reactivated so that the output of memory 40 is loaded into register 46.

Signal SM is reactivated to recover the content of register 46 by the scan path. Signals LD and RD are deactivated and signals CK1 and CKR are again equal to clock DCLK.

The capture register system 46 described hereabove can be used to recover through the scan path the states of any lines not normally accessible by the microcontroller.

The logic functions of circuit 50 can be easily induced by those skilled in the art according to the timing diagrams of FIGS. 6A and 6B and to the explanations given hereabove.

Of course, the present invention is likely to have various alterations, modifications, and improvements which will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. An electronic device including:
    a microcontroller which can be set in a specific mode in which internal registers can be modified from outside;
    a peripheral internally coupled to the microcontroller via interface registers;
    a single input/output lead for communicating with the microcontroller from the outside;
    a peripheral input lead and a peripheral output lead;
    a microcontroller clock lead and a peripheral clock lead;
    wherein the interface registers can be connected according to a shift register configuration forming a test scan path accessible in series and clocked by a clock signal to be applied to the peripheral clock lead, and including a test aid circuit which, in a scan mode, connects the interface registers according to the shift register configuration, the scan mode being selected when a test bit, accessible through the input/output lead, is enabled, and when the input/output lead is forced from the outside to a state distinct from its default state; and
    wherein the device is testable when the test bit is enable via the input/output lead, the clock of the microcontroller is stopped, the input/output lead is forced to the state opposite to its default state, and data is serially input or extracted through the input lead or through the output lead of the peripheral at the rate of the peripheral clock in the scan path.

2. A device according to claim 1, further including a general reset lead directly connected to a reset input of the microcontroller, wherein this general reset lead is connected to a reset input of the peripheral via a flip-flop connected in the scan path.

3. A device according to claim 2, wherein the content of the flip-flop can be modified by the microcontroller.

4. A device according to claim 1, wherein the peripheral includes a memory to which the microcontroller accesses in the read mode through an internal bus, including a flip-flop connected in the scan path and an active state of which causes a reading from said memory, a capture register, also connected in the scan path, being provided for storing the word presented at the memory output.

5. A device according to claim 1, including means for preventing the activation of the reset of the peripheral by a state of the flip-flop when the scan mode is selected.

6. A method of testing an electronic device which includes a microcontroller which can be set in a specific mode in which internal registers can be modified from outside, a peripheral internally coupled to the microcontroller via interface registers, a single input/output lead for communicating with the microcontroller from the outside, a peripheral input lead and a peripheral output lead, a microcontroller clock lead and a peripheral clock lead, wherein the interface registers can be connected according to a shift register configuration forming a test scan path accessible in series and clocked by a clock signal to be applied to the peripheral clock lead, and including a test aid circuit which, in a scan mode, connects the interface registers according to the shift register configuration, the scan mode being selected when a test bit, accessible through the input/output lead, is enabled, and when the input/output lead is forced from the outside to a state distinct from its default state, the method including the steps of:
    enabling the test bit via the input/output lead;
    stopping the clock of the microcontroller;
    forcing the input/output lead to the state opposite to its default state; and
    inputting or extracting data in series at the rate of the peripheral clock in the scan path through the input lead or through the output lead of the peripheral.

* * * * *